US006925061B2

(12) United States Patent
Lee et al.

(10) Patent No.: US 6,925,061 B2
(45) Date of Patent: Aug. 2, 2005

(54) MULTI-CONSTRAINT ROUTING SYSTEM AND METHOD

(75) Inventors: Byoung-Joon Lee, Nepean (CA); Sudhakar Ganti, Kanata (CA); Anand Srinivasan, Kanata (CA); Walter Joseph Carpini, Stittsville (CA); Udo Mircea Neustadter, Carp (CA); Cuong Tu Dang, Ottawa (CA); Vincent Chi Chiu Wong, Ottawa (CA)

(73) Assignee: Tropic Network Inc., Ontario (CA)

( * ) Notice: Subject to any disclaimer, the term of this patent is extended or adjusted under 35 U.S.C. 154(b) by 753 days.

(21) Appl. No.: 10/025,869

(22) Filed: Dec. 26, 2001

(65) Prior Publication Data

US 2003/0118027 A1 Jun. 26, 2003

(51) Int. Cl.[7] ............................ G01R 31/08; H04L 12/28
(52) U.S. Cl. ........................ 370/238; 370/252; 370/401
(58) Field of Search .............................. 370/238, 252, 370/255, 256, 254, 400, 401, 468, 351; 709/105

(56) References Cited

U.S. PATENT DOCUMENTS

| | | | |
|---|---|---|---|
| 5,546,379 A | | 8/1996 | Thaweethai et al. |
| 6,661,797 B1 | * | 12/2003 | Goel et al. ............. 370/395.21 |
| 2002/0141345 A1 | * | 10/2002 | Szviatovszki et al. ...... 370/238 |
| 2004/0022194 A1 | * | 2/2004 | Ricciulli .................... 370/238 |

FOREIGN PATENT DOCUMENTS

| | | |
|---|---|---|
| EP | 0 838 922 A1 | 4/1998 |
| EP | 1 011 227 A2 | 6/2000 |

OTHER PUBLICATIONS

Wang, Z., et al, "Quality–of–Service Routing for Supporting Multimedia Applications", IEEE Journal on Selected Areas in Communications, vol. 14, No. 7, Sep. 1996.

Wang, X., et al, "An Algorithm for QoS Routing to Optimize Network Resource Utilization", Info–Tech and Info Net, Proceedings, vol. 2, Oct. 30, 2001.

Qingming Ma, Peter Steenkiste and Hui Zhang; Routing High–Bandwidth Traffic in Max–Min Fair Share Networks; School of Computer Science, Carnegie Mellen University, Pittsburgh, PA, 15213.

Francois Le Faucheur, Ramesh Uppili, Alain Vedrenne, Pierre Merckx, Thomas Telkamp; Use of IGP Metric as a Second TE Metric; Nov. 2001, pp 1 to 6.

Don Fedyk, Anoop Ghanwani, Rajesh Balay, Jerry Ash; Multiple Metrics for Traffic Engineering with IS–IS and OSPF; Nov. 2000, pp 1 to 8.

Ishida, Kenji; Amano, Kitsutaro; Kannari, Naoki; A Delay–Constrained Least–Cost Path Routing Protocol and the Synthesis Method, IEEE conference, 1998.

Orda, Ariel; Routing With End–to–End QoS Guarantees in Broadband Networks; IEEE/ACM Transactions on Networking, vol. 7, No. 3, Jun. 1999, pp 365–374.

(Continued)

Primary Examiner—Duc Ho
(74) Attorney, Agent, or Firm—Dr. Victoria Donnelly

(57) ABSTRACT

A routing system and method are provided which use a composite cost in identifying routes. This allows a simple way of identifying the best route taking multiple metrics into account for each link simultaneously. The system allows for the inclusion of pruning constraints, and allows for various objectives such as bin packing or load balancing to be achieved.

25 Claims, 6 Drawing Sheets

OTHER PUBLICATIONS

Salama, Hussein F.; Reeves, Douglas S.; Viniotis, Yannis; A Distributed Algorithm for Delay–Contrained Unicast Routing; IEEE, 1997.

Song, Jun; Pung, Hung Keng; Jacob, Lillykutty; A Multi–Constrained Distributed QoS Routing Algorithm; IEEE, 2000, pp 165–171.

Nahrstedt, Shigang Chen Klara; On Finding Multi–Contrained Paths; IEEE conference, 1998.

Zhou, Prof. Jianzhong; A New Distributed Routing Algorithm for Supporting Delay–Sensitive Applications; International Conference on Communication Technology, Oct. 22–24, 1998, Beijing, China.

Fedyk, Don; Ghanwani, Anoop; Ash, Jerry; Vedrenne, Alain; Multiple Metrics for Traffic Engineering With IS–IS and OSPF; IETF Internet Draft, Nov. 2000, pp 1–8.

* cited by examiner

FIG. 4

| NO | CONSTRAINTS | TYPE |
|----|-------------|------|
| 1 | BANDWIDTH PER COS | PRUNING, COST |
| 2 | PRE-EMPTION | PRUNING |
| 3 | PATH EXCLUSION | PRUNING |
| 4 | SOURCE-DESTINATION FIXED DELAY | COST |
| 5 | L1 LOGICAL LINK | PRUNING |
| 6 | L2 LOGICAL LINK | PRUNING |
| 7 | PIR | PRUNING |
| 8 | GROUP PATH BANDWIDTH | PRUNING |
| 9 | PATH DIVERSITY | PRUNING |
| 10 | BE - LOAD BALANCING | COST |
| 11 | ADMINISTRATIVE COST | COST |

| LINKS | AVAILABLE BANDWIDTH | L1LL LOGICAL LINK | L2LL LOGICAL LINK | MAX BW | ADMIN. COST | DELETES | COMPOSITE COST |
|---|---|---|---|---|---|---|---|
| AB | 200 | 1+1 | . | 2500 | 20 | 5 | 202500 |
| BC | 200 | 1+1 | . | 2500 | 30 | 5 | 203500 |
| CD(W) | 50 | 1:1 | . | 2500 | 10 | 6 | 60600 |
| CD(P) | 50 | 1:1 | . | 2500 | 40 | 5 | 54500 |
| AD(W) | 100 | 1:1 | . | 2500 | 50 | 4 | 105400 |
| AD(P) | 100 | 1:1 | . | 2500 | 10 | 5 | 101500 |
| AE | 400 | . | HIGH | 2500 | 20 | 5 | 402500 |
| BE | 500 | 1+1 | . | 2500 | 40 | 4 | 504400 |
| EH | 400 | 1+1 | . | 2500 | 10 | 6 | 401600 |
| EF | 500 | 1+1 | . | 2500 | 30 | 5 | 503500 |
| FH | 100 | NONE | . | 2500 | 20 | 4 | 102400 |
| CF | 500 | 1+1 | . | 2500 | 30 | 4 | 503400 |
| DG | 600 | 1+1 | . | 2500 | 10 | 5 | 601500 |
| GF | 100 | NONE | . | 2500 | 40 | 5 | 104500 |

FIG. 6

MULTI-CONSTRAINT ROUTING SYSTEM AND METHOD

FIELD OF THE INVENTION

The invention relates to systems and methods of identifying routes through a network in accordance with multiple constraints.

BACKGROUND OF THE INVENTION

The problem of identifying routes through a network subject to a single constraint is well known. For example shortest path first algorithms by Dijkstra and Bellman-Ford are well known, and both use a single cost, single constraint approach. Dijkstra's method finds the shortest path between a source and any other node in the network.

The problem of routing while considering multiple constraints, while newer than the single constraint problem, has been addressed in a number of ways. See for example Kenji Ishida, Kitsutaro Amano, "A delay-constrained least-cost path routing protocol and the synthesis method", IEEE conference, 1998; Ariel Orda, "Routing with End to End QoS guarantees in broadband networks", IEEE conference, 1998; H. F. Salama, D. S. Reeves, Y. Viniotis, "A distributed algorithm for delay-constrained unicast routing", IEEE conference, 1997; J. Song, H. K. Pung, L. Jacob, "A multi-constrained distributed QoS routing algorithm", IEEE conference, 2000; S. Chen, K. Nahrstedt, "On finding multi-constrained paths", IEEE conference, 1998; J. Zhou, "A new distributed routing algorithm for supporting delay-sensitive applications", ICCT, 1998.

Most of these approaches use the Dijkstra or Bellman-Ford algorithms as a base algorithm to find a sub-optimal path.

Typical IGP (Internal Gateway Protocol) routing protocols such as OSPF (Open Shortest Path First) advertise a single link metric termed "administrative cost". The default link metric in some cases for this "administrative cost" is the inverse of link bandwidth. Other implementations may use monetary cost, propagation delay etc.

IGP-TE (traffic engineering extension to IGP) adds one more metric which can be advertised within a network. In general, the TE-metric is used to carry any arbitrary metric for constraint based routing of a set of LSPs (Label Switched paths) needing optimization. The current common practice is to use the IGP metric as a second TE metric. (see for example Draft-lefaucheuer-te-metric-igp-01.txt)

Proposals have also been made to extend the number of TE metrics which are to be advertised up to three. (see for example Draft-fedyk-isis-ospf-te-metrics-01.txt).

Existing proposals recommend not to strive for optimization of both the TE metric and the IGP metric during path computation for a given LSP. This is known to be an NP-complete (non-polynomial complete) problem.

SUMMARY OF THE INVENTION

One broad aspect of the invention provides a method of performing multi-constraint routing. The method involves determining a composite cost, composite cost(link)=f (metric$_1$, . . . , metric$_N$, for each of a plurality of links under consideration in a network topology, the composite cost being a function f of a plurality of metrics metric$_1$, . . . metric$_N$ for each link, where N>=2; and performing routing through the network topology from a source to a destination based on the composite costs.

In some embodiments, the composite cost is determined according to:

$$\text{composite cost(link)} = \sum_{i=1}^{N} c_i(\text{metric}_i)^{n(i)}$$

where $c_i$ is a constant for the ith metric, and n(i) is an exponent for the ith metric.

In some embodiments, the composite cost is determined according to:

composite cost(link)=$a$*(1/Bandwidth)+$b$*Admin cost+$c$*Delay where metric$_1$=bandwidth, metric$_2$=Admin cost and metric$_3$=delay, and wherein $c_1$=a, $c_2$=b, and $c_3$=c, n(1)=−1, n(2)=1 and n(3)=1.

In some embodiments for each link, at least one network node advertises the link's metrics across the network such that any node in the network may implement the multi-constraint routing.

In some embodiments, the composite cost increases with decreasing available bandwidth such routing is performed in a manner which promotes load balancing.

In some embodiments, the routing is performed in a manner which promotes load balancing with demand reservation on at least one link. This may involve for example defining a respective demand threshold for at least one link representing demand reservation for the at least one link.

This may involve for adjusting the costs according to:

if (available bandwidth<demand_threshold) cost=composite cost+ very large value else cost=composite cost where demand_threshold is a respective demand reservation for the link.

Typically, the demand_threshold is set to a first value for at least one of the links, and is set to a second larger value for at least one of the links whereby bandwidth on the at least one of the links having the first value is reserved for larger bandwidth requests.

In some embodiments, for each of a plurality of different traffic types, a respective different composite cost equation is used for calculating the composite costs. The different traffic types might for example include video, voice and data, might include different classes of service/qualities of service.

In some embodiments, the method further involves providing at least one pruning constraint for each link, and pruning the network topology on the basis of the at least one pruning constraints to remove at least one link from the network topology. In this case, performing routing through the network from a source to a destination based on the composite costs is conducted using only the links not pruned from the network topology. The pruning of the network topology on the basis of the at least one pruning constraints to remove at least one link from the network topology is performed on an as needed basis to remove one or more links from a set of candidate links. Alternatively, pruning the network topology on the basis of the at least one pruning constraints to remove at least one link from the network topology may be performed on the entire network topology prior to performing the routing.

In some embodiments, at least one constraint is used both as a pruning constraint and as a constraint used in the composite costs.

Another broad aspect of the invention provides a routing system adapted to perform multi-constraint routing. The routing system has a topology repository adapted to store information identifying links, nodes and connections of a network. There is a multi-constraint router adapted to determine a composite cost $$\text{composite cost(link)} = f(\text{metric}_1, \ldots, \text{metric}_N)$$

for each of a plurality of the links in the network topology, the composite cost being a function f of a plurality of metrics $\text{metric}_1, \ldots \text{metric}_N$ for each link, where N>=2, and to perform routing through the network topology from a source to a destination based on the composite costs. The routing system may be implemented to provide any one or more of the above introduced methods.

BRIEF DESCRIPTION OF THE DRAWINGS

Preferred embodiments of the invention will now be described with reference to the attached drawings in which:

FIG. 4 is a table of constraints and constraint types;

FIG. 6 is an example set of metrics for the network topology of FIG. 5;

DETAILED DESCRIPTION OF THE PREFERRED EMBODIMENTS

Figure 1:
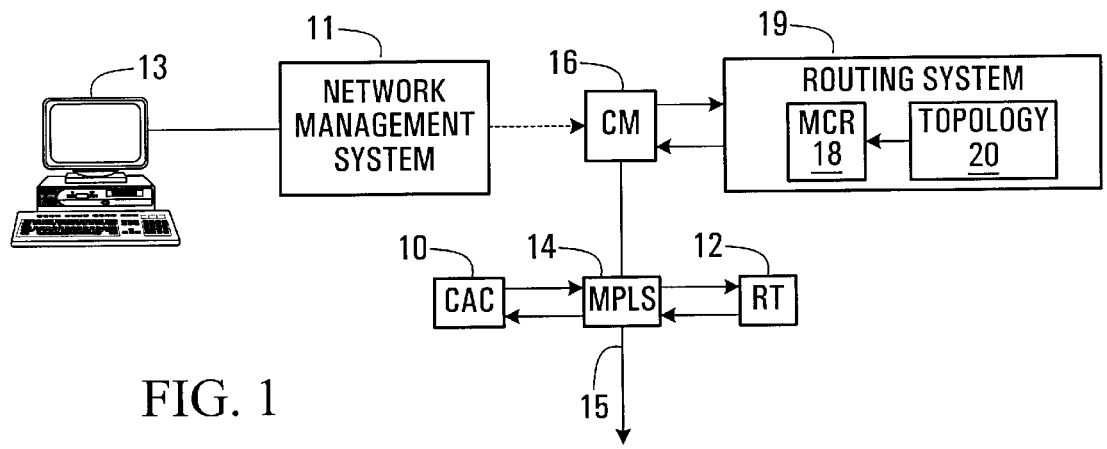
FIG. 1 is a block diagram of an example system within which an embodiment of the invention may be employed.

FIG. 1 is a diagram of an example system within which an embodiment of the invention may be employed. The system has a CM (connection management) function 16 through which requests for new connections are received. An MPLS (multi-protocol label switching) protocol 14 is used to propagate requests to network components after a potential route has been identified. A CAC (call admission control) function 10 controls whether or not calls are to be admitted. An RT (resource tracker) 12 keeps track of resources. The CM 16 interacts with a routing system 19 which has an MCR (multi-constraint routing) function 18 which identifies routes through a network as a function of a network topology indicated at 20.

The process in setting up a connection involves first a customer 13 sending a service request to a network management system 11 which forwards the request to CM 16 which translates the request into a meaningful path request message with (source, destination, constraints). CM 16 then requests a path from routing system 19. The MCR function 18 within the routing system 19 calculates an optimal path between the source and destination satisfying the constraints using a new algorithm provided by an embodiment of the invention. Then, CM 16 requests MPLS 14 (or other route establishment system) to set up the path. MPLS 14 checks for resource availability before sending the request on to the next hop as indicated by arrow 15.

In one embodiment, given a network G=<N,E>, where N is the set of nodes and E the set of links, the task of the MCR function 18 is to find an optimal path between a given source and destination satisfying two sets of constraints. The first set of constraints is referred to herein as pruning constraints, and these constraints are constraints which allow the elimination of one or more routes from the set of possible routes. These are constraints that assist in narrowing the search to a reduced candidate path set. Examples of potential pruning constraints include bandwidth, pre-emption, path exclusion, peak information rate, and link protection. The second set of constraints is referred to herein as cost constraints, and these are used in considering routes left over after application of the pruning constraints. These constraints are used in calculation of cost for every path in the reduced candidate set. Examples of potential cost constraints include administrative cost, bandwidth, and delay. Not every implementation necessarily will include pruning constraints, but all implementations will include cost constraints. Some constraints may be used both as pruning and cost constraints.

An example set of constraints is shown in the table of FIG. 4 where eleven different example constraints are given. Bandwidth per CoS (class of service) may be employed as a pruning or cost constraint. The pre-emption state of a link (indicating whether it is pre-emptable or not) may be used as a pruning constraint. Path exclusion (indicating that a particular path should not be used, e.g. maintenance) is a pruning constraint. The source-destination fixed delay is a cost constraint. L1 logical link protection and L2 logical link protection are pruning constraints as are the PIR, group path bandwidth, and path diversity. Best effort load balancing and administrative cost are both cost constraints. It is to be understood that this is a non-limiting set of example constraints. Some or all and/or completely different constraints than these example constraints may be employed in an actual implementation. In some applications, it may be useful to classify the constraints differently than as outlined above.

Figure 2:
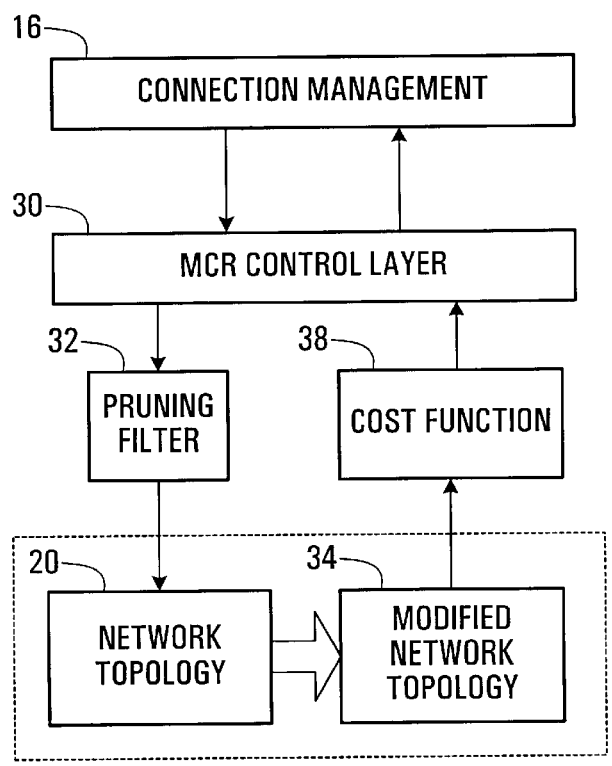
FIG. 2 is a block diagram of the routing system of FIG. 1.

A more detailed block diagram of the routing system 19 is shown in FIG. 2. The routing system 19 has a MCR control layer 30 which co-ordinates the receipt and response to requests from the connection management function 16. A pruning filter 32 performs pruning on the network topology 20 to produce a modified network topology 34. Cost function 38 performs a cost calculation on the modified network topology 34 and identifies a minimum cost path.

Figure 3:
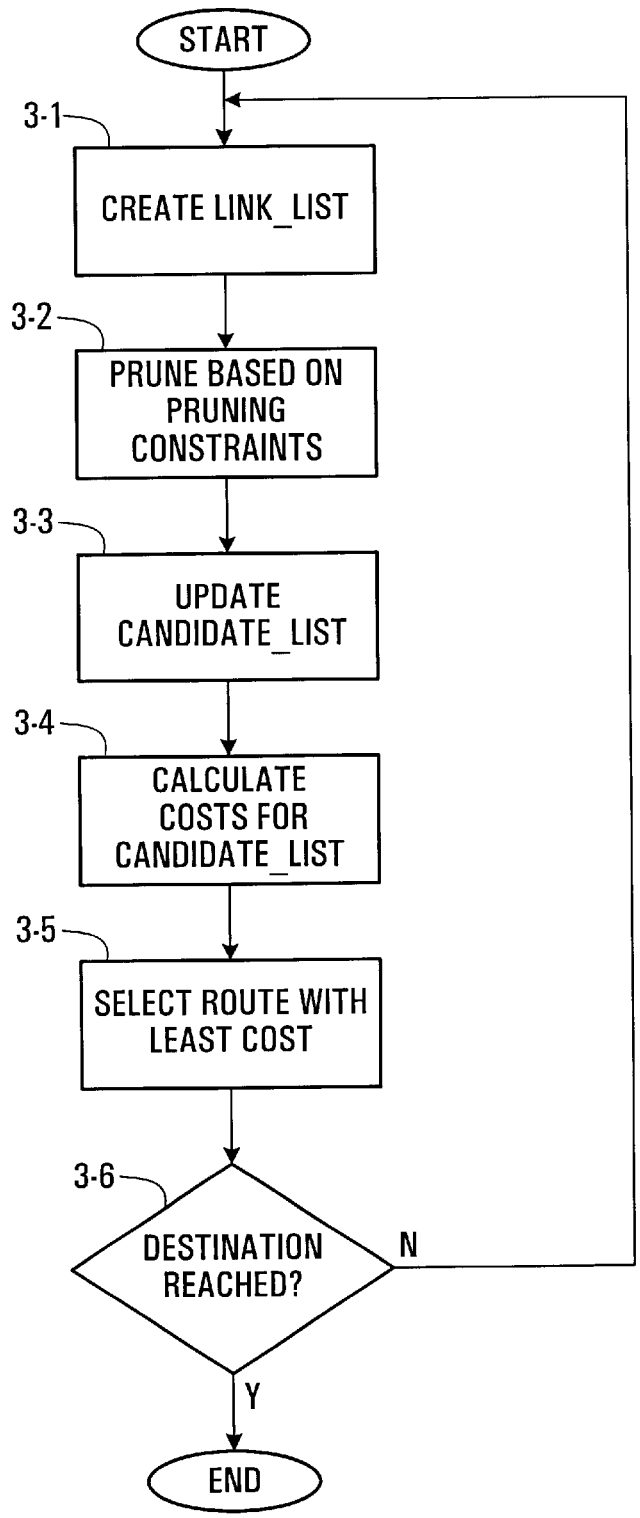
FIG. 3 is a flowchart of an example method of routing by the routing system of FIG. 2.

The function of the routing system in identifying a route from a source node to a destination node will be described in further detail with reference to the flowchart of FIG. 3. In identifying the route, two different lists are maintained on an ongoing basis. The first such list is referred to as the link_list, and is the list of links directly connected to a current node (the node for which a next link in the route is to be identified). The second such list is referred to as the candidate_list, and is the list of all possible routes/partial routes identified thus far. These lists are clarified below.

In step 3-1, the algorithm starts at each current node with the creation of a link_list consisting of all links connecting to the current node. Initially, the current node is the source node, and the initial link_list will be all links connecting directly to the source node. Also, initially, the candidate_list will be empty. It is noted the whole algorithm is typically run by the same node, and the nodes referred to are logical nodes in the network topology.

In step 3-2, all links in the link_list that do not satisfy the pruning constraints are pruned, i.e. removed from the link_list.

In step 3-3, the candidate_list is updated as a function of the pruned link_list. For the first iteration, the candidate_list is set to equal the link_list of links leaving the source node. For subsequent iterations, the candidate_list is updated by adding to the candidate_list routes which make use of a previous route in the candidate_list plus a link in the pruned link_list.

In step 3-4, for all routes newly added to the candidate_list, a cost is calculated based on the cost constraints. This involves first calculating the cost for each link in the pruned link_list. Then, the cost for a particular route which makes use of a previous route in the candidate_list and a particular link from the pruned link_list is calculated by adding the cost of the previous route to the cost of the link from the pruned link_list.

Finally, in step 3-5, the route that has the least cost as determined by the cost constraints is selected for the current iteration. The next "current node" is the node terminating the selected route. When a particular route is selected, the previous route in the candidate_list which was used to build the particular route is removed from the candidate list. All other routes remain in the candidate list.

These steps are repeated until the destination is reached.

In another embodiment, the pruning of the entire network topology is done at the very beginning, and then a standard routing protocol run on the remaining topology.

Another broad aspect of the invention provides a cost function for use in performing routing functions. In one embodiment, the cost function is employed in conjunction with the above described system with two constraint types. More generally, the approach can be used in any routing system. A new composite cost function having the following format is employed:

$$\text{Cost(link)} = f(\text{metric}_1, \text{metric}_2, \ldots, \text{metric}_N)$$

where $f(.)$ is a multi-variable function, and $\text{metric}_1, \ldots, \text{metric}_N$ are metrics advertised for each link. In all cases $N \geq 2$, and in a preferred embodiment, $N=3$.

In a specific example, the composite cost function has the following format:

$$\text{Cost(link)} = \sum_{i=1}^{N} c_i (\text{metric}_i)^{n(i)}$$

where $c_i$ is a scaling constant for the ith metric, and $n(i)$ is an exponent. In a particular example of this format, consider the case where the three metrics are bandwidth, administrative cost and delay. A very specific preferred format of the composite cost is:

$$\text{Cost(link)} = a^*(1/\text{Bandwidth}) + b^*\text{Admin cost} + c^*\text{Delay}$$

where a, b, c are constants that can be engineered depending upon goals defined for the routing system. In this equation, bandwidth is the available bandwidth, and a is the bandwidth coefficient. Admin cost is the administrative cost provided by administrator, and b is the administrative cost coefficient. Delay is the delay introduced by the link and c is the delay coefficient. In this case, $\text{metric}_1 = \text{bandwidth}$, $\text{metric}_2 = \text{Admin cost}$ and $\text{metric}_3 = \text{delay}$, and wherein $c_1 = a$, $c_2 = b$, and $c_3 = c$, $n(1) = -1$, $n(2) = 1$ and $n(3) = 1$.

It should be noted that this composite cost function approach is not an attempt to optimize multiple link metrics simultaneously, which can be degenerated to an NP-complete problem. Rather, it is an approach to take multiple link metrics into consideration in a flexible manner.

Figure 5:
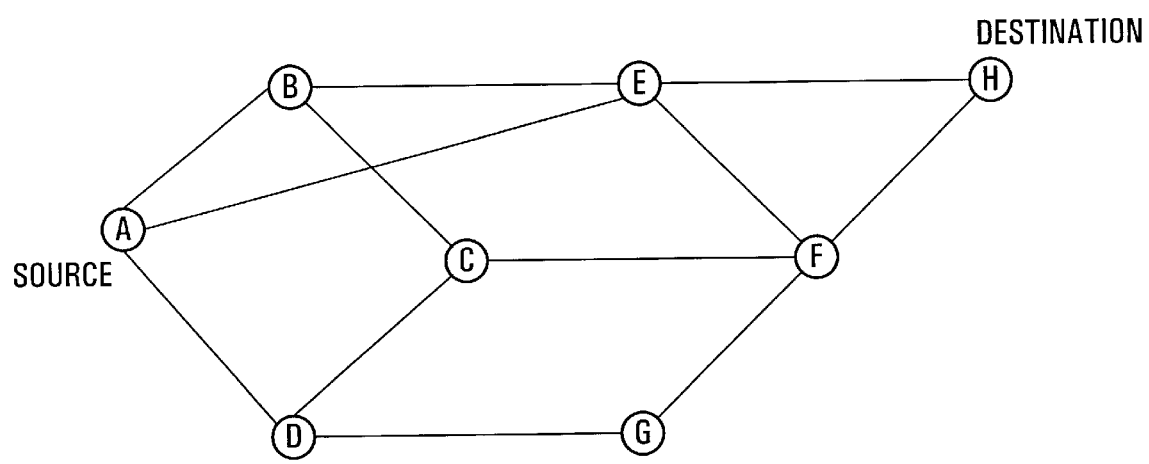
FIG. 5 is an example network topology.

An example network topology to which the MCR function may be applied is shown in FIG. 5. FIG. 5 shows a topology consisting of eight nodes labeled A, B, C, D, E, F, G and H, and having twelve links AB, AD, AE, BC, BE, CF, CD, DG, EF, EH, GF, FH. This network topology will be used in example applications described below. It is assumed that link AE is a layer 2 logical link which would actually pass through node B.

An example set of metrics associated with the various links of FIG. 5 is presented in the table in FIG. 6. There is a set of parameters for each link, and in the event a given link has a protection path, there is a set of parameters for the protection path. In the illustrated example, it is assumed that links CD and AD have both working and protection paths. Each link has an available bandwidth field which indicates an available bandwidth metric for the link. This needs to be updated each time a new route is provisioned on a given link. Each link has a maximum bandwidth field indicating the maximum total bandwidth supported by the link. Each link also has an administrative cost metric and a delay metric. The available bandwidth, admin cost, and delay are preferably advertised network wide by whatever node in the system has first hand knowledge. For embodiments in which pruning is to be performed on the basis of the type of protection available for links, the table would include for each link an L1LL field when appropriate indicating for layer 1 links the type of protection for the link if any. Each link would also have an L2LL field when appropriate indicating for layer 2 logical links the type of protection for the link if any.

For this example, it is assumed that a customer wants to set up a link between nodes A and F. The connection management function 16 processes the request, and converts it into a request which makes sense to the routing system 19. In one example, the request is converted into the following set of parameters:

The minimum set of parameters are source, destination and bandwidth:

Source—identifies the source node for the request;

Destination—identifies the destination node for the request;

Bandwidth—the requested bandwidth for the connection.

In some implementations, one or more of the following may also be included as part of the request:

Pre-emptable state—identifies whether the link is pre-emptable—only required in embodiments contemplating pruning based on this state. For this example, it is assumed that pruning based on this state is not to be employed;

Delay—identifies a maximum delay tolerable for the requested route. Other parameters/constraints might also be included.

An example request might be as follows:

(source=A, destination=F, bandwidth=150)

These parameters would be passed to the routing system 19 which then identifies the best route through the network. For this example, the previously introduced cost function is used, namely $$\text{Cost} = a^*(1/\text{Bandwidth}) + b^*\text{Admin cost} + c^*\text{Delay}$$

and for this example, we assume that $a=1000$, $b=100$, and $c=100$.

Figure 7:
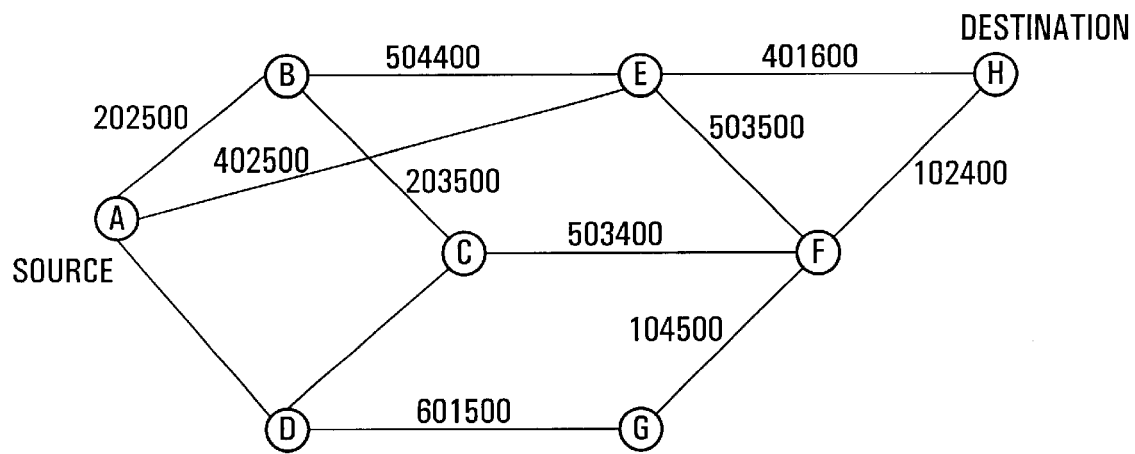
FIG. 7 is the network topology of FIG. 5 with composite costs.

Referring to FIG. 7, shown is a version of FIG. 5 with the composite cost values filled in for each link. The working and protection paths for links AD and DC are also shown. It is noted that the composite costs need not necessarily be all computed at once, but rather in a stepwise fashion as required, and as described below. Next, any routing algorithm may be employed using the composite costs as a single cost per link.

The composite cost approach which employs the inverse of the available bandwidth will result in load balancing occurring across available links, at least to a certain degree depending upon the impact of the other metrics on the composite cost. Load balancing means that the occupancy of the various links will increase in a somewhat balanced way.

In another embodiment of the invention, a different cost function is employed for different connection requests. The particular cost function may for example be selected as a function of traffic type for the connection. For example, the traffic types might include voice, video, and data, and three different cost functions may be employed for these different traffic types. By way of a very specific example, for the three metric example given above, this can be summarized as follows:

| Traffic Type | a = bandwidth coefficient | b = admin coefficient | c = delay coefficient |
|---|---|---|---|
| Video | a1 | b1 | c1 |
| Voice | a2 | b2 | c2 |
| Data | a3 | b3 | c3 |

Then, if a request comes in for a video connection, the costs are computed using a1, b1 and c1. If a request comes in for a voice connection, the costs are computed using a2, b2 and c2. Finally, if a cost comes in for a data connection, the costs are computed using a3, b3 and c3.

More generally, a different cost equation may be used for different connection request types. This could be based on class of service/quality of service, or some other type of characteristics.

In another embodiment of the invention, the composite costs can be manipulated in such a way as to promote load balancing with demand reservation. Bin packing involves preferentially reserving a portion of bandwidth on certain links until a sufficiently large bandwidth request is received, thereby ensuring that the large bandwidth request can in fact be serviced. Consider a simple example in which two possible links each have a maximum bandwidth of 100. If load balancing is employed until such time that the two links have an occupancy of 85 and 90 respectively, a new request for 20 will not be serviceable on either link. To decrease call blocking probabilities, bin packing routes all traffic to one link until full then moves on to next link but this introduces congestion on particular links and does not follow the load balancing approach.

Figure 8:
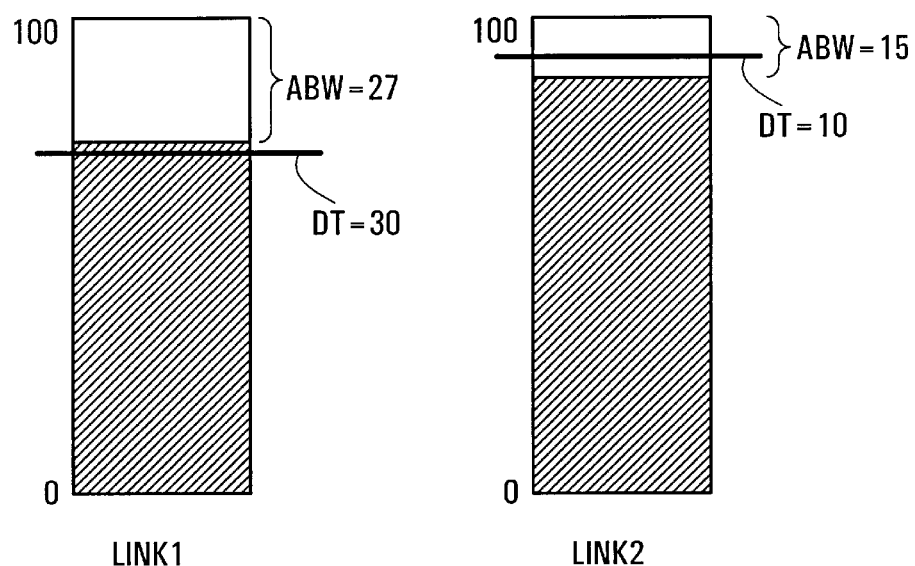
FIG. 8 depicts a first hybrid load balancing heuristic.

In this embodiment, the links are load balanced up to certain points. Demand reservation is employed to reserve some capacity for larger bandwidth connections. For this example, in order for load balancing to occur, there must be an available bandwidth term in the composite cost, and the composite cost must increase with decreasing available bandwidth such as is the case when a term a (1/available bandwidth) is included. An example of load balancing with demand reservation will be described with reference to FIG. 8. Shown is the bandwidth occupancy of two alternative links, link1 and link2. A demand threshold DT is indicated for the two links. In the example, the DT for link1 is 30 and the DT for link2 is 10, the demand threshold being a measure in per cent of a specified fraction of the maximum bandwidth, normalized to 100. Load balancing is employed up to and including when a connection is made which results in a watermark being exceeded by one or more of the links. Load balancing means the normal composite costs introduced earlier are used in performing the routing function. At that point, a new conditional composite cost is calculated as follows for links which are to have reserved bandwidth:

if (available bandwidth $\leq$ DT=demand threshold)

cost=composite cost+MAXCOST else cost=composite cost

MAXCOST is just a large number which will prevent the link from being selected. If two links both have this MAXCOST then they will cancel each other out and load balancing will prevail. Thus, in the simple two link example, after the watermark is passed, one of the links is selected to have reserved bandwidth for higher bandwidth requests. In the illustrated example, the demand threshold for link1 has been crossed and there is an available bandwidth of 27. The demand threshold for link2 has not been crossed and there is an available bandwidth of 15. Now, if a requested bandwidth of 25 is received, there is room for this on link1 because of the demand reservation made for that link. When both demand thresholds are crossed, the method reverts to load balancing again.

Numerous modifications and variations of the present invention are possible in light of the above teachings. It is therefore to be understood that within the scope of the appended claims, the invention may be practiced otherwise than as specifically described herein.

We claim:

1. A method of performing multi-constraint routing comprising:

determining a composite cost:

composite cost(link)=$f$(metric$_1$, . . . , metric$_N$)

for each of a plurality of links under consideration in a network topology, the composite cost being a function f of a plurality of metrics metric$_1$, . . . metric$_N$ for each link, where N>=2;

providing at least one pruning constraint for each link;

pruning the network topology on the basis of the at least one pruning constraints to remove at least one link from the network topology;

performing routing through the network topology from a source to a destination based on the composite costs wherein performing routing through the network from a source to a destination based on the composite costs is conducted using only the links not pruned from the network topology.

2. A method according to claim 1 wherein the composite cost is determined according to:

$$\text{composite cost(link)} = \sum_{i=1}^{N} c_i(metric_i)^{n(i)}$$

where $c_i$ is a constant for the ith metric, and n(i) is an exponent for the ith metric.

3. A method according to claim 2 wherein the composite cost is determined according to:

composite cost(link)=$a$*(1/Bandwidth)+$b$*Admin cost+$c$*Delay where metric$_1$=bandwidth, metric$_2$=Admin cost and metric$_3$=delay, and wherein c$_1$=a, c$_2$=b, and c$_3$=c, n(1)=−1, n(2)=1 and n(3)=1.

4. A method according to claim 1 further comprising:

for each link, at least one network node advertising the link's metrics across the network such that any node in the network may implement the multi-constraint routing.

5. A method according to claim 1 further wherein:
the composite cost increases with decreasing available bandwidth such routing is performed in a manner which promotes load balancing.

6. A method according to claim 5 further comprising:
performing the routing in a manner which promotes load balancing with demand reservation on at least one link.

7. A method according to claim 6 further comprising:
defining a respective demand threshold for at least one link representing demand reservation for the at least one link.

8. A method according to claim 7 further comprising:
computing a cost for each said at least one link as follows:

if (available bandwidth<demand_threshold)

cost=composite cost+very large value else cost=composite cost where demand_threshold is a respective demand reservation for the link.

9. A method according to claim 8 wherein the demand_threshold is set to a first value for at least one of the links, and is set to a second larger value for at least one of the links whereby bandwidth on the at least one of the links having the first value is reserved for larger bandwidth requests.

10. A method according to claim 1 further comprising:
for each of a plurality of different traffic types, using a respective different composite cost equation for calculating the composite costs.

11. A method according to claim 10 wherein the different traffic types include video, voice and data.

12. A method according to claim 10 wherein the different traffic types include different classes of service/qualities of service.

13. A method according to claim 1 wherein:
pruning the network topology on the basis of the at least one pruning constraints to remove at least one link from the network topology is performed on an as needed basis to remove one or more links from a set of candidate links.

14. A method according to claim 13 wherein at least one constraint is used both as a pruning constraint and as a constraint used in the composite costs.

15. A method according to claim 1 wherein:
pruning the network topology on the basis of the at least one pruning constraints to remove at least one link from the network topology is performed on the entire network topology prior to performing the routing.

16. A routing system adapted to perform multi-constraint routing, the system comprising:
a topology repository adapted to store information identifying links, nodes and connections of a network
a multi-constraint router adapted to determine a composite cost:

composite cost(link)=$f(\text{metric}_1, \ldots, \text{metric}_N)$ for each of a plurality of the links in the network topology, the composite cost being a function f of a plurality of metrics $\text{metric}_1, \ldots, \text{metric}_N$ for each link, where N>=2, and to perform routing through the network topology from a source to a destination based on the composite costs the routing system further comprises,
a pruning filter adapted to implement at least one pruning constraint by pruning the network topology on the basis of the at least one pruning constraint to remove at least one link from the network topology;
wherein the multi-constraint router performs routing through the network from a source to a destination based on the composite costs is conducted using only the links not pruned from the network topology.

17. A routing system according to claim 16 wherein the multi-constraint router is adapted to determine the composite cost is determined according to:

$$\text{composite cost(link)} = \sum_{i=1}^{N} c_i (\text{metric}_i)^{n(i)}$$

where $c_i$ is a constant for the ith metric, and n(i) is an exponent for the ith metric.

18. A routing system according to claim 17 wherein the multi-constraint router is adapted to determine the composite cost is determined according to:

composite cost(link)=$a*(1/\text{Bandwidth})+b*\text{Admin cost}+c*\text{Delay}$ $\text{metric}_1$=bandwidth, $\text{metric}_2$=Admin cost and $\text{metric}_3$=delay, and wherein $c_1$=a, $c_2$=b and $c_3$=c, n(1)=−1, n(2)=1 and n(3)=1.

19. A routing system according to claim 16 further comprising:
an input for receiving on an ongoing basis for each link, updated values for the metrics for the link.

20. A routing system according to claim 16 wherein the multi-constraint router is adapted to perform the routing in a manner which promotes load balancing.

21. A routing system according to claim 20 wherein the multi-constraint router is adapted to perform the routing in a manner which promotes load balancing with demand reservation.

22. A routing system according to claim 21 wherein the multi-constraint router is adapted to allocate at least one link to contain bandwidth reserved for higher bandwidth requests.

23. A routing system according to claim 22 wherein the multi-constraint router is adapted to compute the cost for each said at least one link as follows:

if (available bandwidth<demand_threshold)

cost=composite cost+very large value else cost=composite cost where demand_threshold is respective demand reservation for the link.

24. A routing system according to claim 16 wherein the multi-constraint router is adapted to, for each of a plurality of different traffic types, use a respective different composite cost equation for calculating the composite costs.

25. A routing system according to claim 16 adapted to prune and compute costs only for links belonging to routes in a candidate list.

* * * * *

UNITED STATES PATENT AND TRADEMARK OFFICE
CERTIFICATE OF CORRECTION

PATENT NO. : 6,925,061 B2                                              Page 1 of 1
APPLICATION NO. : 10/025869
DATED : August 2, 2005
INVENTOR(S) : B. J. Lee et al.

It is certified that error appears in the above-identified patent and that said Letters Patent is hereby corrected as shown below:

Title page, "(73) Assignee: Tropic Network Inc.," is corrected to read as --(73) Assignee: Tropic Networks, Inc.,--

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,925,061 B2 | Page 1 of 1 |
| APPLICATION NO. | : 10/025869 | |
| DATED | : August 2, 2005 | |
| INVENTOR(S) | : B. J. Lee et al. | |

It is certified that error appears in the above-identified patent and that said Letters Patent is hereby corrected as shown below:

Title page, "(73) Assignee: Tropic Network Inc.," is corrected to read as --(73) Assignee: Tropic Networks Inc.,--

This certificate supersedes the Certificate of Correction issued April 6, 2010.

Signed and Sealed this

Thirtieth Day of November, 2010

David J. Kappos
*Director of the United States Patent and Trademark Office*